US008660908B2

(12) United States Patent
Chalemin et al.

(10) Patent No.: US 8,660,908 B2
(45) Date of Patent: Feb. 25, 2014

(54) ONLINE AUCTION PROPAGATION

(75) Inventors: Glen E. Chalemin, Austin, TX (US);
Indran Naick, Cedar Park, TX (US);
Clifford J. Spinac, Austin, TX (US);
Calvin L. Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1380 days.

(21) Appl. No.: 11/854,809

(22) Filed: Sep. 13, 2007

(65) Prior Publication Data

US 2009/0076831 A1 Mar. 19, 2009

(51) Int. Cl.
*G06Q 40/00* (2012.01)

(52) U.S. Cl.
USPC ............................................ 705/26.3; 705/37

(58) Field of Classification Search
CPC ...................................................... G06Q 40/00
USPC .................. 705/1–50; 1/1–38; 709/20–60
See application file for complete search history.

(56) References Cited

U.S. PATENT DOCUMENTS

| 6,604,089 | B1 | 8/2003 | Van Horn et al. | |
|---|---|---|---|---|
| 6,862,580 | B1 * | 3/2005 | Ford | 705/37 |
| 7,565,313 | B2 * | 7/2009 | Waelbroeck et al. | 705/37 |
| 8,275,673 | B1 | 9/2012 | Poon et al. | |
| 2003/0041008 | A1 * | 2/2003 | Grey et al. | 705/37 |
| 2003/0233315 | A1 * | 12/2003 | Byde et al. | 705/37 |
| 2004/0128224 | A1 * | 7/2004 | Dabney et al. | 705/37 |
| 2005/0182705 | A1 * | 8/2005 | McLemore et al. | 705/37 |
| 2006/0041548 | A1 * | 2/2006 | Parsons et al. | 707/5 |
| 2007/0130044 | A1 * | 6/2007 | Rowan | 705/37 |
| 2007/0294140 | A1 * | 12/2007 | Bezos et al. | 705/27 |
| 2008/0097896 | A1 * | 4/2008 | Fisher et al. | 705/37 |
| 2008/0114671 | A1 * | 5/2008 | Goel et al. | 705/37 |
| 2008/0235126 | A1 * | 9/2008 | Dueck et al. | 705/37 |
| 2009/0182642 | A1 * | 7/2009 | Sundaresan | 705/26 |
| 2011/0208608 | A1 * | 8/2011 | Kumar | 705/26.3 |
| 2012/0136745 | A1 | 5/2012 | Chalemin et al. | |

OTHER PUBLICATIONS

Dunn, Jacquelin R., et al., "Leveraging Web-Based Information Systems", *Information Systems Management*, (Sep. 1, 1999),16:4, 1-10.
Fontoura, Marcus et al., "Decentralized Peer-to-Peer Auctions", *Electronic Commerce Research*. Year: 2005, vol. 5, No. 1,7-24.
"U.S. Appl. No. 13/368,898 Office Action", Jun. 13, 2012 , 10 pages.
"U.S. Appl. No. 13/368,898 Final Office Action", Jan. 9, 2013 , 19 pages.

* cited by examiner

*Primary Examiner* — Thomas M Hammond, III
(74) *Attorney, Agent, or Firm* — DeLizio Gilliam, PLLC (57) ABSTRACT

It has been discovered that instances of an item to be sold in online auctions may be linked to an already created online auction listing for the item. The associating propagates the online auction listing to these other item instances. The propagating allows junior bidders (i.e., losing bidders) to continue pursuing purchase of the associated item instances and allows the junior sellers of the associated item instances to leverage the information of the online auction listing.

6 Claims, 6 Drawing Sheets

ONLINE AUCTION PROPAGATION

BACKGROUND

1. Field

Embodiments of the invention(s) generally relate to the field of auctions, and, more particularly, to online auctions.

2. Background

The same items are often placed for auction online by several sellers. Each seller completes information for the online auctions. Much of the information is redundant across the online auctions for the same item. Each seller pays listing fees, and, essentially, competes against the other sellers to sell their item. Buyers, on the other hand, see several online auctions for the same item that are listed separately. Buyers then bid in one or more of the auctions.

SUMMARY

A method comprises generating an indication of a first instance of an item. An online auction for a second instance of the item is located. The first item instance is associated with the located online auction using the generated indication of the first instance of the item. After the online auction ends, a junior bidder in the online auction is notified of the associated first instance of the item. The junior bidder is junior to a winning bidder in the online auction.

BRIEF DESCRIPTION OF THE DRAWINGS

The present embodiments may be better understood, and their numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present embodiments. However, it is understood that the described embodiments may be practiced without these specific details. For instance, although examples refer to notifications being transmitted, other techniques of communicating information about status of bids and an online auction listing may be employed. In other instances, well-known instruction instances, protocols, structures and techniques have not been shown in detail in order not to obfuscate the description.

Information entered for an online auction listing of an item can be leveraged or recycled for other instances of the item. If the creator of the online auction ("senior seller") allows linking or associating of other instances of the item being auctioned to the online auction listing, then the other sellers (junior sellers) can reap the benefits of the already created online auction listing, such as relying on the information (e.g., text, images, etc.) entered by the senior seller. In addition to allowing junior sellers to avoid some of the labor of creating an online auction listing for their instances of the item, the junior sellers may also benefit from the experience or presentation ability of the senior seller. For example, the senior seller may be a successful seller partly due to presentation of the item in the online auction listing. Association of other item instances to the online auction listing may also benefit bidders. Bidders could rely on notifications of other associated instances of the item instead of participating in multiple auction listings. In addition, a bidder who is not a winning bidder ("junior bidder") does not necessarily have to wait through another auction. The bid of the junior bidder may be accepted for one of the associated item instances.

Figure 1:
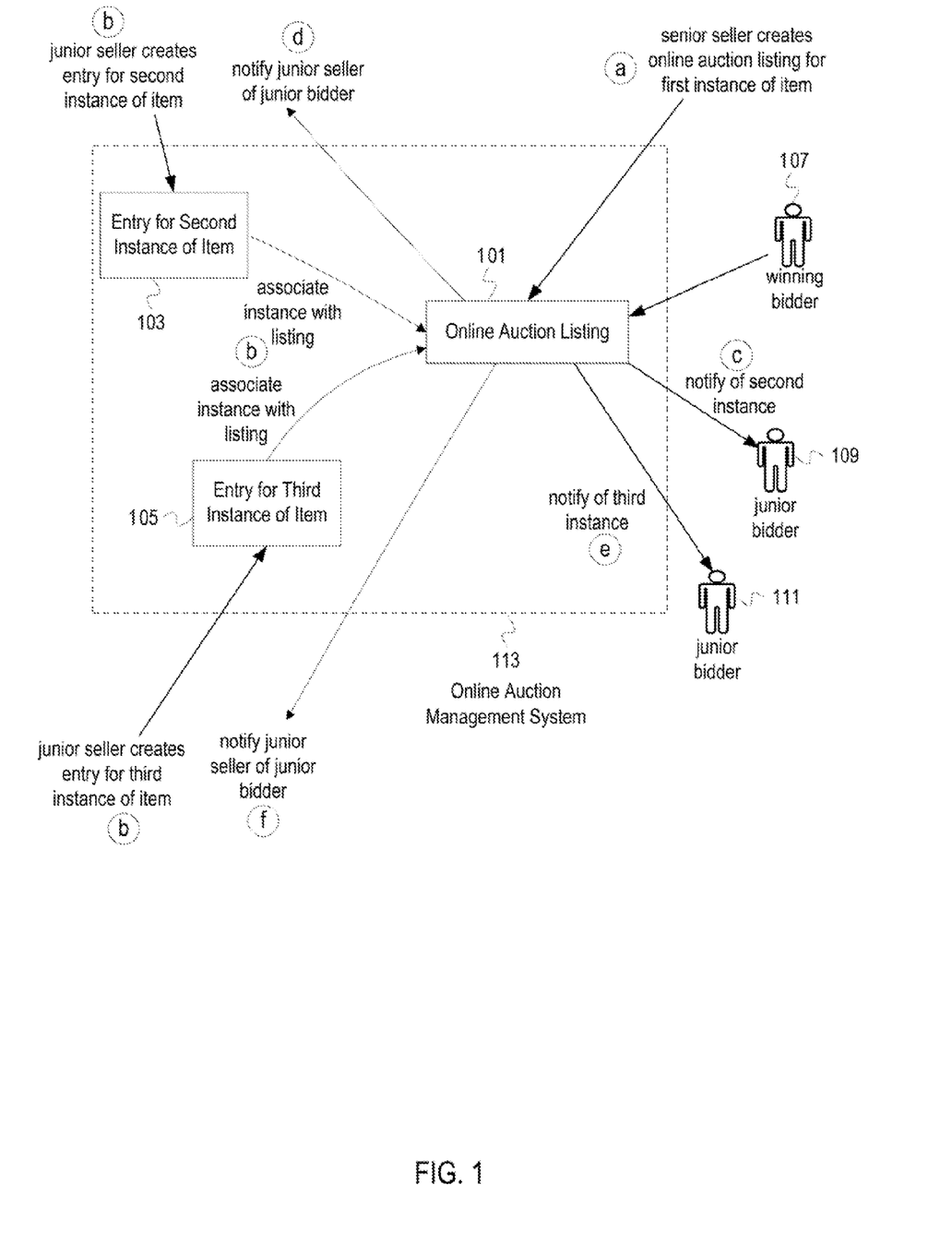
FIG. 1 depicts an example of an online auction listing being propagated to associated item instances.

FIG. 1 depicts an example of an online auction listing being propagated to associated item instances. In FIG. 1, letters a-f are used to aid in illustrating temporal relationships between events. Each of the letters may represent a point in time or a period of time. So, for example, multiple events with the same letter may occur at a same point in time (i.e., in parallel) or in a same time period (e.g., in temporal proximity). A senior seller creates an online auction listing 101 for a first instance of an item at a time a. The online auction listing is created in and/or with an online auction management system 113. The online auction management system 113 represents software and/or hardware employed to facilitate online auctions. In a time period b, two junior sellers create entries 103 and 105 for a second and a third instance of the items respectively, in and/or with the online auction management system 113. The junior sellers input information that describes their item instances, whether briefly or in detail. Some information may be required for item instance entries that are not complete auction listings. Examples of such information include condition of item instance (e.g., new, used, etc.), color, size, etc.

The entries 103 and 105 are associated with the online auction listing 101. The associating of item instance entries with an online auction listing may be automatic, involve user input, etc. The degree to which the associating is automatic will vary among embodiments. For instance, the online auction management system 113 may automatically associate the entries 103 and 105 with the online auction listing 101. In another example, the online auction management system 113 associates the entries 103 and 105 with the listing 101 if certain conditions are satisfied. In yet another example, the online auction management system 113 associates the entries 103 and 105 with the listing 101 if commanded by the junior seller and/or senior seller, after the junior seller and/or the senior seller respond to prompts about associating, etc.

At the end of the auction, a winning bidder 107 is determined. If a junior bidder satisfies condition for sale that may exist for the second instance, then the junior bidder 109 is notified of the second instance of the item in a time period c. If the junior bidder wishes, the bid of the junior bidder 109 is submitted to the junior seller of the second instance at a time d. Assuming the bid from the junior bidder 109 is accepted by the junior seller of the second instance, a junior bidder 111 is notified of the third instance at a time e, if the junior bidder 111 satisfies any sale conditions that may exist for the third instance. If the junior bidder 111 wishes, then the bid submitted for the online auction listing 101 from the junior bidder 111 is submitted to the junior seller of the third instance.

As can be seen from the depiction of FIG. 1, some redundancies are removed by allowing instances of an item to be associated with an online auction listing for the item. Transactions between sellers and buyers for several instances of an item can be expedited by this sharing of information. In addition, a senior seller can perhaps enjoy additional revenue by charging junior sellers a fee for associating their item instances to the online auction listing. The fee may be a flat fee, a percentage of the sell price of the associated item instance, etc.

Figure 2:
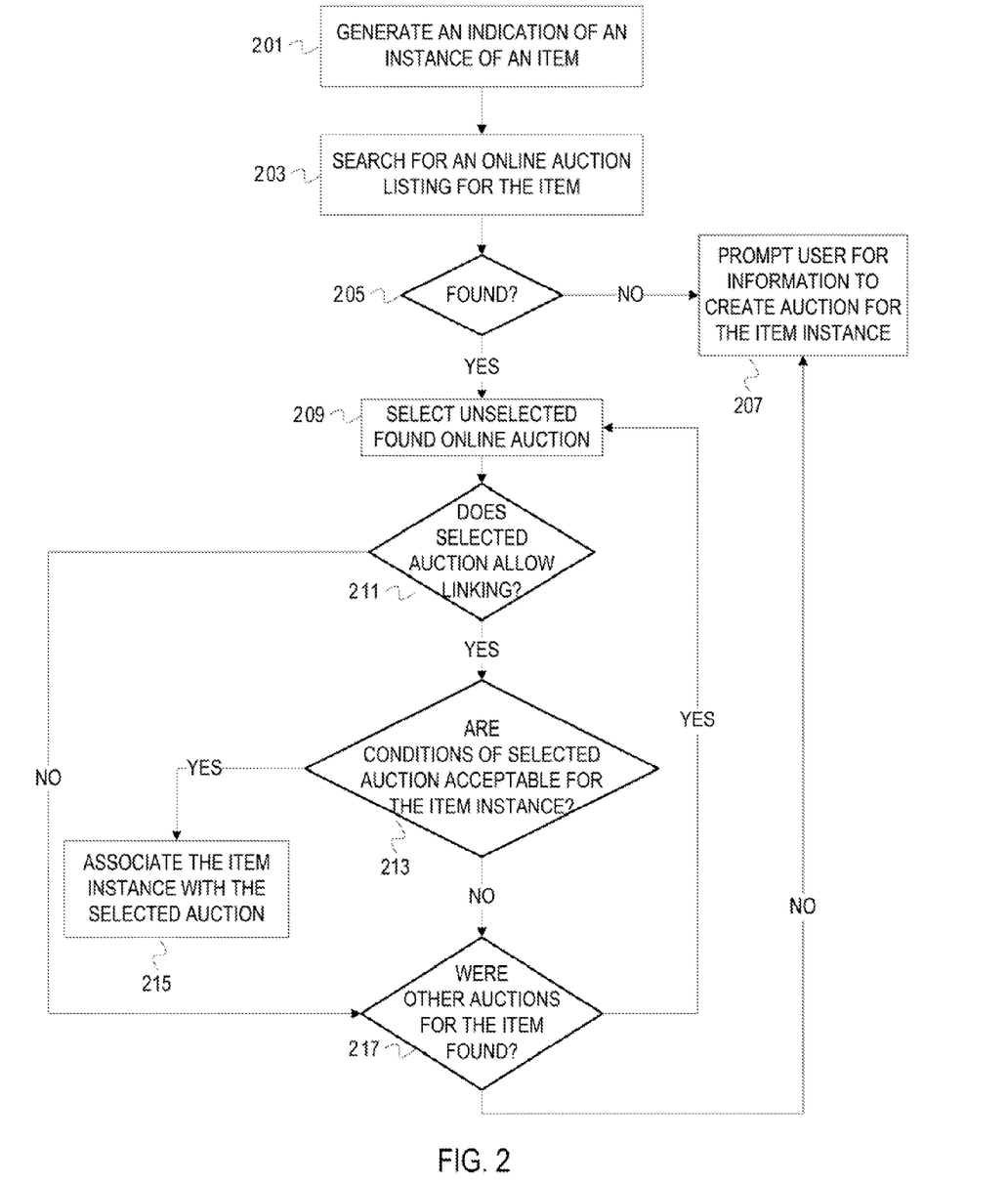
FIG. 2 depicts a flowchart of example operations for associating an instance of an item with an online auction listing for the item.

FIG. 2 depicts a flowchart of example operations for associating an instance of an item with an online auction listing for the item. At block 201, an indication of an instance of an item is generated. For example, an online auction system generates an identifier for an entry of an item instance. At block 203, a search is performed for an online auction listing for the item. For example, a search is performed on a title field of auction listings or item identifier field of auction listings to determine if any auction listing indicates an item that matches to some degree with information about the item instance. To illustrate, the item instance may be a red widget. It may be sufficient that an online auction listing indicates a widget, or the matching threshold may not be satisfied unless the auction listing indicates that the widget for sale is also red.

At block 205, it is determined if an online auction listing for the item is found. If an online auction listing is found at block 205, then control flows to block 209. If an online auction listing is not found, then control flows to block 207.

At block 207, a user (i.e., the seller of the item instance) is prompted for information to create an online auction listing for the item instance.

At block 209, a found unselected online auction listing is selected. Selection of the found online auction listing may be implicit or explicit (e.g., an identifier may be recorded, search results with pointers may be used, etc.). At block 211, it is determined if the selected online auction listing allows linking. If not, then control flows to block 217. If the selected online auction listing allows linking, then control flows to block 213.

At block 213, it is determined if conditions or rules of the selected online auction listing are acceptable for the item instance. Examples of rules or conditions include reserve price, bid increment, start time, end time, shipping charges, and minimum reputation level of bidders. If the conditions of the selected online auction listing are acceptable for the item instance, then control flows to block 215. If the conditions are not acceptable for the item instance, then control flows to block 217.

At block 215, the item instance is associated with the selected online auction listing. For example, an identifier of the online auction listing is recorded in an entry for the item instance and an identifier of the item instance is recorded in the online auction listing. The identifier or indication of the item instance may be visible to bidders participating in the online auction listing, hidden until the end of the online auction listing, etc.

At block 217, it is determined if there were other online auction listings for the item found. If not, then control flows back to block 207. If other online auction listing were found, then control flows back to block 209.

Figure 3:
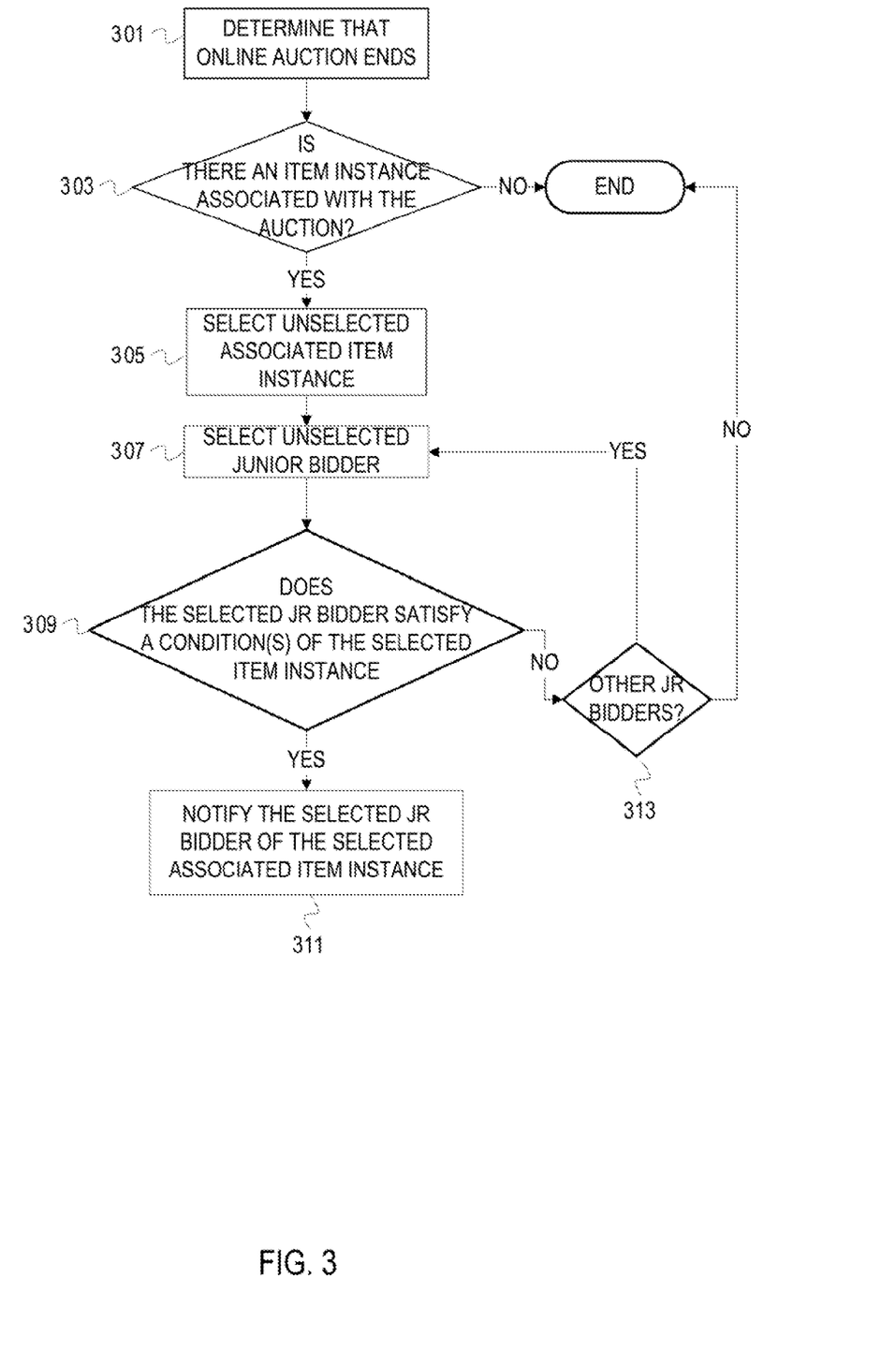
FIG. 3 depicts a flowchart of example operations for notifying junior bidders of associated item instances.

FIG. 3 depicts a flowchart of example operations for notifying junior bidders of associated item instances. At block 301, it is determined that an online auction ends. At block 303, it is determined if any item instances were associated with the online auction. If not, then the operations end. If there are associated item instances, then control flows to block 305.

At block 305, an unselected associated item instance is selected. At block 307, an unselected junior bidder is selected. At block 309, it is determined if the selected junior bidder satisfies one or more conditions of the item instance. For example, it is determined if the reputation of the junior bidder satisfies a minimum bidder reputation designated for the item instance. If the one or more conditions for the item instance are not satisfied by the selected junior bidder, then control flows to block 313. If the one or more conditions of the item instance are satisfied by the selected junior bidder, then control flows to block 311.

At block 313 it is determined if there are other junior bidders. If so, then control flows to block 307. If there are not other junior bidders, then operations end.

At block 313, the selected junior bidder is notified of the selected associated item instance. For example, a message is transmitted to an e-mail address or a text message is sent to a mobile communications device of the junior bidder. The message includes a link or contact information for the associated item instance. The message may also include information that indicates any differences between the item described in the online auction listing and the associated item instance. Embodiments may also use a structure that groups together the associated item instances and junior bidders. For example, a bulletin board type mechanism may indicate at least some of the associated item instances in priority order, if applicable. Junior bidders of the online auction that has ended are also indicated in the bulletin board type mechanism. As junior bidders withdraw or submit bids to junior sellers, status of the item instances are updated and/or indications are removed from the bulletin board.

Figure 4:
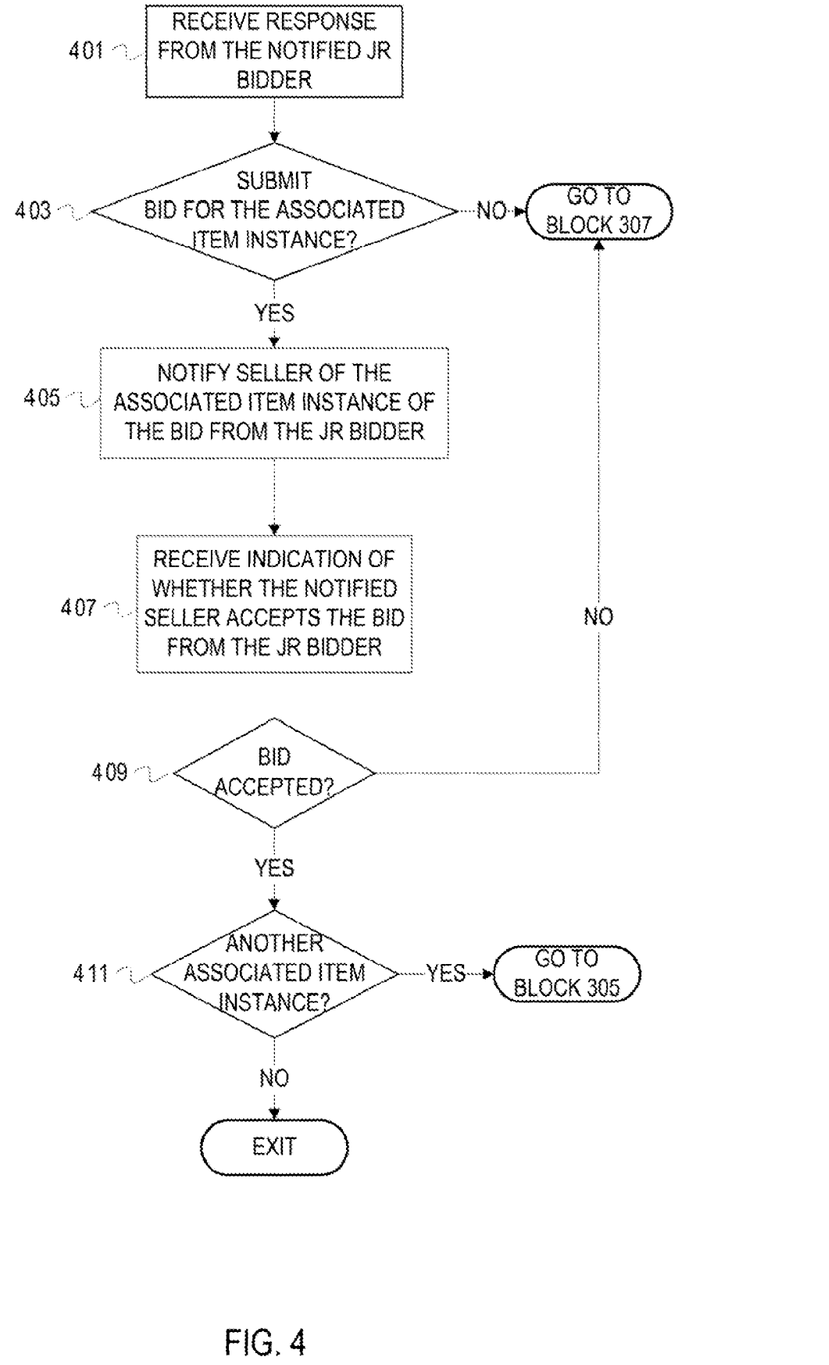
FIG. 4 depicts a flowchart of example operations for handling bids for an association item instance from junior bidders.

FIG. 4 depicts a flowchart of example operations for handling bids for an association item instance from junior bidders. At block 401, a response is received from a junior bidder who has been notified of the associated item instance. At block 403, it is determined if the junior bidder is withdrawing or submits a bid for the associated item instance. If the junior bidder is withdrawing, then control flows to block 307. If the junior bidder is submitting a bid, then control flows to block 405.

At block 405, the seller of the associated item instance is notified of the bid from the junior bidder. A dashed line from block 405 to block 407 represents that the flow of operations may not be flow directly from block 405 to block 407 while waiting for a response from the junior seller of the item instance. At block 407, an indication is received from the junior seller of whether the bid from the junior bidder is accepted. At block 409, it is determined if the junior seller accepts the bid. If not, then control flows to block 307. If the junior seller accepts the bid, then control flows to block 411. The junior seller may also wish to withdraw completely, which would end the flow of operations.

At block 411, it is determined if another item instance is associated with the online auction listing. If there is another associated item instance, then control flows to block 305. If there is not another associated item instance, then the flow of operations ends.

The example operations in the above flowcharts should not be used to limit embodiments. Fewer, additional, or different operations may be performed by different embodiments. For example, block 213 in FIG. 2 may not be performed. Embodiments may wait until a junior bidder is available (i.e., the online auction listing has ended and a winning bidder is ascertained) and then determine if rules for sale of the item instance are satisfied. As another example, rules for the item instance may be compared against rules for the auction listing. If the rules match within a certain threshold, then the rules for the online auction listing may be wholly or partially adopted for the item instance, or override the rules for the item instance. With reference to FIG. 3, block 309 may not be performed. For instance, a bidder that satisfies the condition(s) of the online auction may automatically be acceptable for the item instance. As another example, additional operations may be performed to determine if a junior bidder who does not satisfy a condition(s) of a first associated item instance satisfies a condition(s) of a second associated item instance. In addition, the operations depicted in the flowcharts may not exactly represent embodiments because implementations will vary. For instance, operations may flow differently for implementations that handle notifications by a module at a client machine of a junior seller. In addition, operations may differ in a distributed system implementation.

Figure 5:
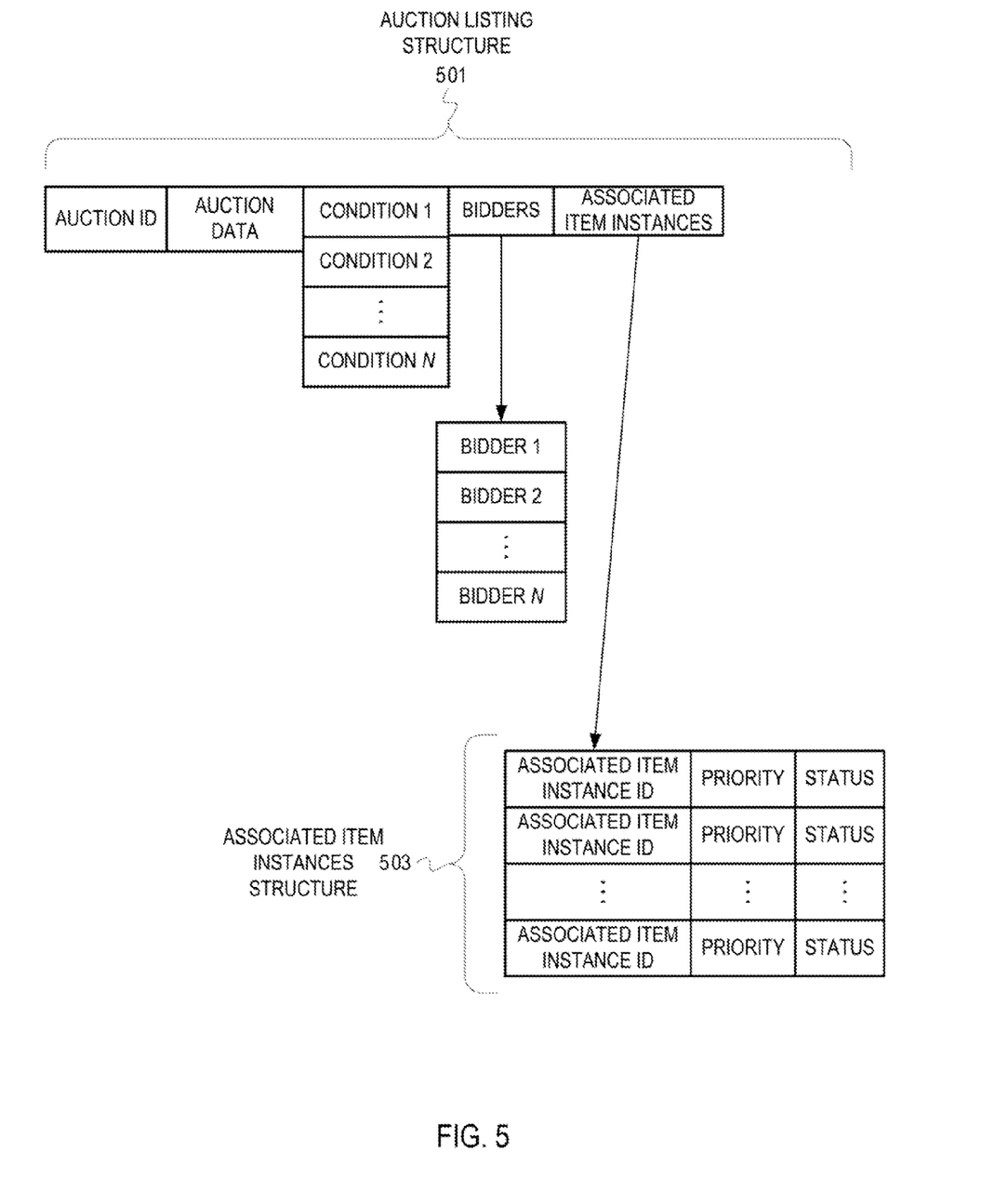
FIG. 5 depicts a conceptual diagram of an example online auction listing structure.

FIG. 5 depicts a conceptual diagram of an example online auction listing structure. An auction listing structure 501 includes an auction identifier field, an auction data field, a list of conditions, a bidder field, and an associated item instances field. The auction identifier field identifies a particular online auction listing. The auction data field includes data for the online auction listing (e.g., item description, seller information, etc.). The list of conditions indicate one or more conditions to be satisfied (e.g., reserve price, shipping cost, minimum bidder reputation, etc.). The bidder field includes a reference or pointer to profiles or data for multiple bidders participating in the online auction for the item. The associated item instances field refers to an associated item instances structure 503.

The associated item instances structure 503 includes an entry for each item instance associated with the online auction listing represented by the structure 501. Each entry indicates an identifier for an associated item instance, a priority of the associated item instance, and a status. Although not required, priority may be recorded for each associated item instance to track priority that may change. For example, priority may be based on when an entry was associated with the online auction listing. Priority, however, may be modified or assigned by fee paid. Similarly, status information, which is also not necessary, may be employed for various reasons. For example, status (e.g., purchased, pending, etc.) may be used to allow a junior seller to view status, for a system to monitor and send notifications based on status change, etc.

The depicted conceptual diagram is intended to illustrate information that may be recorded for associated item instances and should not limit the numerous possible implementations of structures, information, recording location, etc. For instance, the example structure 501 is depicted with a list of conditions, but conditions may be encoded in any of a number of ways (e.g., a tree, array, linked list, hardware table, hash table, separate structure, etc.).

It should be understood that the figures and description are meant to aid in understanding embodiments and not intended to limit embodiments. In the depiction of FIG. 1, numerous assumptions are made to aid in understanding FIG. 1 without obfuscating embodiments. For instance, it is assumed associating is allowed by the senior seller and priority among the junior sellers is already assumed. Such variables that can affect the transactions are assumed to avoid cluttering the description with every possible seller/bidder decision or sale condition. Furthermore, the lines depicted in FIG. 1 should not be interpreted too literally. The depicted lines are not intended to suggest that an online auction listing performs operations, such as notifying bidders and sellers. Although it is possible that an online auction listing may include code to perform various operations, embodiments are also envisioned that perform operations, such as locating the listing and notifying bidders/sellers, with modules of online auction management system 113. The separation of functions should also not be limited by the depictions herein. Instead of a single monolithic system that handles all aspects of an online auction, functions may be performed across any number of system components (e.g., modules, routines, servers, databases, cards, ASICs, etc.) that interface or exchange messages. Further, FIG. 1 assumes additional instance being sold by different sellers. A single seller may create the online auction listing for a first instance of an item and associate his/her own other instances of the item with the online auction listing.

The described embodiments may be provided as a computer program product, or software, that may include a machine-readable medium having stored thereon instructions, which may be used to program a computer system (or other electronic device(s)) to perform a process according to embodiments of the invention, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Figure 6:
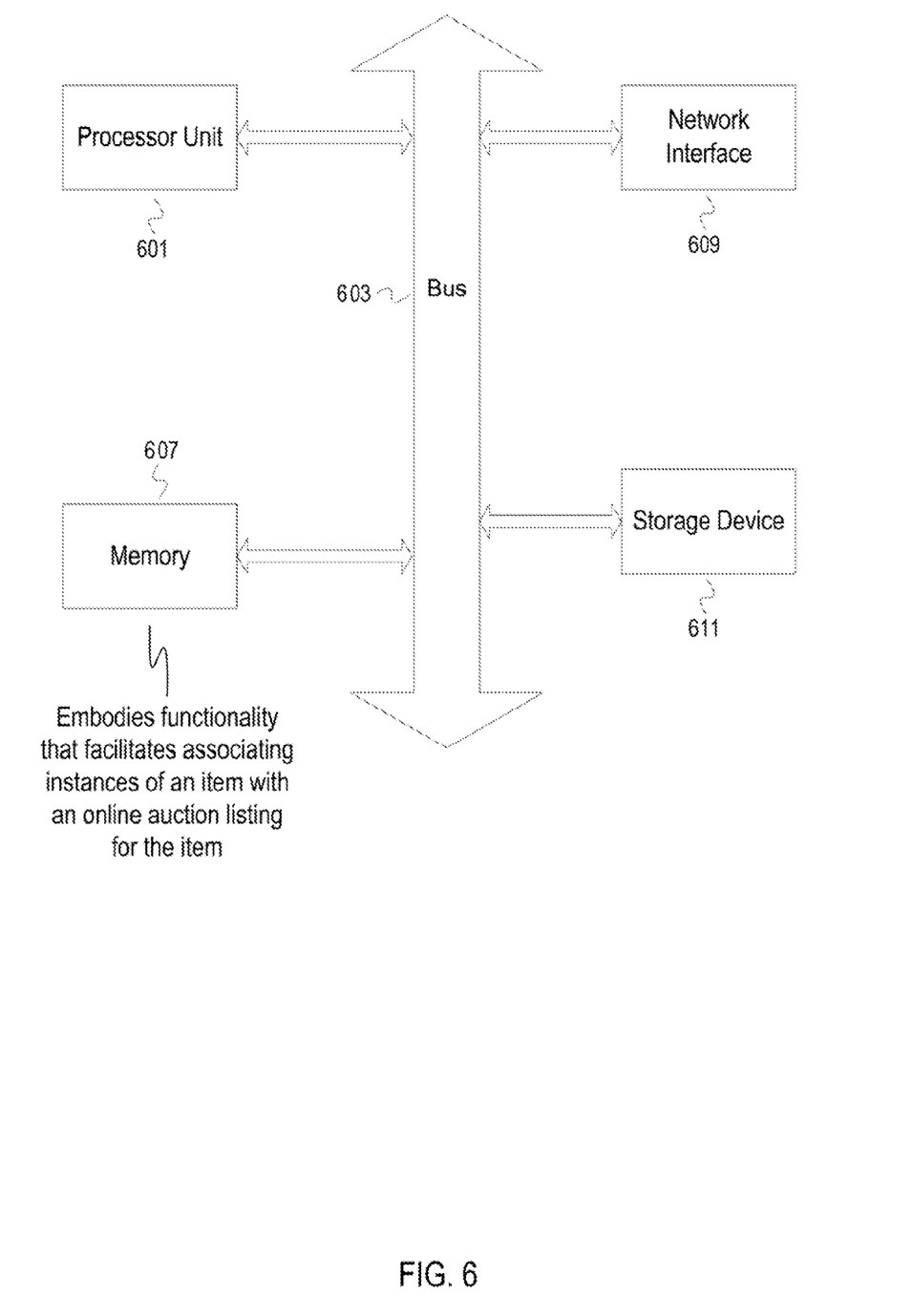
FIG. 6 depicts an example computer system.

FIG. 6 depicts an example computer system. A computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, RDRAM, EDO RAM, DDR RAM, EEPROM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The system memory 607 embodies functionality to implement embodiments described above. The system memory 607 may include one or more functionalities that facilitate associating instances of an item with an online auction listing for the item. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

While the embodiment are described with reference to various implementations and exploitations, it will be understood that these embodiments are illustrative and that the scope of the invention(s) is not limited to them. In general, techniques for associating item instances with an online auction listing for the item as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
receiving a bid for a first item being auctioned in a first auction in an online auction system;
determining, by a processor, one or more attributes of the first item;
determining that a second online auction in the online auction system for a second item has a number of one or more attributes that match a number of the one or more attributes of the first item;
determining that the number of the one or more attributes of the second item that match the number of the one or more attributes of the first item exceed a matching threshold;
determining that the first auction has completed;
after determining that the first auction has completed and after determining that the number of the one or more attributes of the second item match the number of the one or more attributes of the first item exceed the matching threshold, after the first online auction has completed,
providing a sale of the second item to a losing bidder of the first online auction prior to completion of the second online auction and without receiving a winning bid for the second online auction from the losing bidder of first online auction, wherein the winning bid for the second online auction is based, at least in part, on a bid made in the first online auction by the losing bidder, wherein the sale of the second item to the losing bidder is without a bid in the second online auction by the losing bidder, wherein the providing the sale of the second item comprises executing the sale of the second item between the seller of the second item and the losing bidder of the first online auction.

2. One or more non-transitory machine-readable media having stored therein a program product, which when executed by a set of one or more processing units causes the set of one or more processing units to perform operations that comprise:
receiving a bid for a first item being auctioned in a first auction in an online auction system;
determining one or more attributes of the first item;
determining that a second online auction in the online auction system for a second item has a number of one or more attributes that match a number of the one or more attributes of the first item;
determining that the number of the one or more attributes of the second item that match the number of the one or more attributes of the first item exceed a matching threshold;
determining that the first auction has completed;
after determining that the first auction has completed and after determining that the number of the one or more attributes of the second item match the number of the one or more attributes of the first item exceed the matching threshold, after the first online auction has completed,
providing a sale of the second item to a losing bidder of the first online auction prior to completion of the second online auction and without receiving a winning bid for the second online auction from the losing bidder of first online auction, wherein the winning bid for the second online auction is based, at least in part, on a bid made in the first online auction by the losing bidder, wherein the sale of the second item to the losing bidder is without a bid in the second online auction by the losing bidder, wherein the providing the sale of the second item comprises executing the sale of the second item between the seller of the second item and the losing bidder of the first online auction.

3. The method of claim 1, wherein the first item is being auctioned in the online auction system by a first seller, wherein the second item is being auctioned in the online auction system by a second seller, wherein the method comprises:
after determining that the first auction has completed and after determining that the number of the one or more attributes of the second item match the number of the one or more attributes of the first item exceed the matching threshold,
charging a fee to the second seller after the sale of the second item to the losing bidder is complete, wherein the fee comprises at least one of a flat fee and a percentage of a sell price of the first item in the online auction system.

4. The one or more non-transitory machine-readable media of claim 2, wherein the first item is being auctioned in the online auction system by a first seller, wherein the second item is being auctioned in the online auction system by a second seller, wherein the operations further comprise:
after determining that the first auction has completed and after determining that the number of the one or more attributes of the second item match the number of the one or more attributes of the first item exceed the matching threshold,
charging a fee to the second seller after the sale of the second item to the losing bidder is complete, wherein the fee comprises at least one of a flat fee and a percentage of a sell price of the first item in the online auction system.

5. The method of claim 1, wherein executing the sale of the second item between the seller of the second item and the losing bidder of the first online auction comprises:
receiving authorization from the losing bidder to submit the bid made in the first online auction;
transmitting the bid made in the first online auction to a seller of the second item; and
receiving acceptance to purchase the second item from the seller of the second item based on the bid made in the first online auction.

6. The one or more non-transitory machine-readable media of claim 2,
wherein executing the sale of the second item between the seller of the second item and the losing bidder of the first online auction comprises:
receiving authorization from the losing bidder to submit the bid made in the first online auction;

transmitting the bid made in the first online auction to a seller of the second item; and receiving acceptance to purchase the second item from the seller of the second item based on the bid made in the first online auction.

* * * * *